United States Patent
Arrington et al.

[11] Patent Number: 5,888,713
[45] Date of Patent: Mar. 30, 1999

[54] ATMOSPHERIC PRESSURE GLOW DISCHARGE TREATMENT OF PAPER BASE MATERIAL FOR IMAGING APPLICATIONS

[75] Inventors: Eric E. Arrington, Farmington; David A. Glocker, West Henrietta; Theodore J. Tatarzyn, Rochester, all of N.Y.

[73] Assignee: Eastman Kodak Company, Rochester, N.Y.

[21] Appl. No.: 858,683

[22] Filed: May 19, 1997

[51] Int. Cl.⁶ .................................................. G03C 1/79
[52] U.S. Cl. .................. 430/532; 430/531; 430/937; 204/164; 204/165; 422/186.05; 422/907; 427/562
[58] Field of Search ..................... 430/532, 937, 430/531; 204/164, 165; 422/186.05, 907; 427/562

[56] References Cited

U.S. PATENT DOCUMENTS

| | | | |
|---|---|---|---|
| 3,411,908 | 11/1968 | Crawford et al. | 430/503 |
| 4,147,836 | 4/1979 | Middleton et al. | 428/481 |
| 4,220,471 | 9/1980 | Date et al. | 430/532 |
| 4,476,153 | 10/1984 | Kiritani et al. | 427/536 |
| 5,316,739 | 5/1994 | Yoshikawa et al. | 422/186.05 |
| 5,403,453 | 4/1995 | Roth et al. | 204/164 |
| 5,414,324 | 5/1995 | Roth et al. | 315/111.21 |
| 5,456,972 | 10/1995 | Roth et al. | 428/224 |
| 5,466,333 | 11/1995 | Guttag | 162/6 |
| 5,714,308 | 2/1998 | Romach et al. | 430/523 |

FOREIGN PATENT DOCUMENTS

| | | | |
|---|---|---|---|
| 94/28568 | 12/1994 | WIPO | H01J 7/24 |

*Primary Examiner*—Mark F. Huff
*Attorney, Agent, or Firm*—Carl F. Ruoff

[57] ABSTRACT

The present invention is a method of producing a photographic support. The method includes providing a photographic paper and transporting the photographic paper through an atmospheric glow discharge zone, wherein the atmospheric glow discharge zone contains a gas with a dielectric strength which is less than air. The atmospheric glow discharge zone is subjected to an electric frequency between 40 kHz and 13.56 Mhz and an electric field such that an atmospheric glow discharge is formed; and the photographic paper is coated with a polymeric coating.

13 Claims, 2 Drawing Sheets

5,888,713

ATMOSPHERIC PRESSURE GLOW DISCHARGE TREATMENT OF PAPER BASE MATERIAL FOR IMAGING APPLICATIONS

FIELD OF THE INVENTION

This invention describes an improved process for treating imaging paper with electrical discharges at atmospheric pressure to promote the adhesion of subsequent coated layers.

BACKGROUND OF THE INVENTION

Corona discharges are used widely in industry to promote adhesion between various materials. In manufacturing polymer coated paper products, there is a large body of literature describing various applications of coronas to make polymeric coatings adhere to paper substrate materials. Almost all of these coronas are produced by applying a high voltage (approximately 5–10 kV), typical frequency (10 kHz) signal to electrodes in air at atmospheric pressure. See, for example, U.S. Pat. No. 3,411,908, 4,147,836, 4,220,471, 4,476,153, or 5,466,333. There are limitations to the usefulness of corona treatments, however. Coronas produce locally energetic discharges, known commonly as streamers, and these streamers may cause a non-uniform level of treatment. Furthermore, although coronas are generally effective at promoting adhesion of polyethylene to paper, they are relatively ineffective at promoting the adhesion between paper and other polymers such as PET, PEN, etc. Thus, there remains a need to improve adhesion between paper and other polymers.

An alternative method of pretreating paper for polymer coatings is with low pressure glow discharge treatments. Glow discharges are, by nature, very diffuse and homogeneous, producing a more uniform treatment. A major disadvantage in glow discharge treatments done at reduced pressures is the problem of maintaining a low pressure at the treatment station. This is an especially acute problem for paper, since its porous structure contains air and is continuously degassing during the treatment process. It is necessary to use either a batch process, in which the paper is loaded into a chamber and the air is removed, or an in-line process, which requires that the support pass through a differential pressure region. In the first case, the support must go through an additional offline step before the coatings are applied. This is unattractive from a product-flow perspective and requires additional capital. The second choice is difficult and expensive to implement because of the very tight tolerances needed to maintain the pressure differentials in the transport path. This requires expensive and complicated hardware and pumps. The closer to atmospheric pressure that these treatments can be done, the simpler and less costly the process becomes.

It is known that under the right conditions, stable diffuse glow discharges can be produced at atmospheric pressures. Work in this area has been limited and directed primarily at etching of photoresist and deposition of materials. However, there are references to treatments for adhesion (WO 94/28568). Many reports indicate that a reliable method of producing diffuse glow discharges at atmospheric pressures is to use helium as the discharge gas. Furthermore, Yoshikawa et al (U.S. Pat. No. 5,316,739) have described devices to be used to treat rubber at atmospheric pressure with helium and mixtures of helium with other gases. They use power supplies ranging in frequency from dc to 13.56 MHz, and show no advantage to be gained by using a particular frequency or small range of frequencies.

In U.S. Pat. No. 5,558,843 a method of treating a polymeric support comprising a first electrode having a first surface, the first electrode having a plurality of spaced apart holes adjoining the first surface, positioning a second electrode, having a second surface spaced apart from the first surface of the first electrode, pumping gas through the holes wherein the gas is greater than or equal to atmospheric pressure, the gas comprising helium and optionally oxygen and/or nitrogen, coupling power to the first electrode having a frequency of 10 kHz to 50 MHz, and positioning a web between the first surface of the first electrode and the second surface of the second electrode wherein the polymeric web is subjected to atmospheric glow discharge to improve the adhesive properties was disclosed.

The above method has been found to be very useful, but it is quite important in photographic systems to be able to run paper at extremely fast rates, such as 30 meters per minute or above and at comparatively low power densities, such as 5 joules per square centimeter or less.

In U.S. Pat. No. 5,714,308 was described a preferred combination of treatment gases and treatment frequencies that allow the use of the above device at higher than expected speeds and lower than expected power densities. Specifically, the gas comprises helium and optionally oxygen and/or nitrogen. Particularly effective and fast treatments are possibly when the power supply operates at a frequency of between 40 kHz and about 500 kHz.

One disadvantage of using the technique described in the aforementioned filings is the need for a treatment electrode fabricated with a plurality of closely-spaced holes. Making such an electrode requires precision machining, leading to considerable cost. Furthermore, it is matched to a particular drum electrode, and is not interchangeable with other diameter drums. There would be considerable advantages to being able to use standard corona discharge treatment devices, many of which are already in-place throughout photographic manufacturing operations, to achieve the same results described in these previous filings.

The present invention solves the above mentioned problems and provides a method for improving the adhesion between photographic paper and polymer coatings such as polyethylene.

SUMMARY OF THE INVENTION

The present invention is a method of producing a photographic support. The method includes providing a photographic paper and transporting the photographic paper through an atmospheric glow discharge zone, wherein the atmospheric glow discharge zone contains a gas with a dielectric strength which is less than air. The atmospheric glow discharge zone is subjected to an electric frequency between 40 kHz and 13.56 Mhz and an electric field such that an atmospheric glow discharge is formed; and the photographic paper is coated with a polymeric coating.

For a better understanding of the present invention, together with other and further objects, advantages and capabilities thereof, reference is made to the following detailed description and claims in connection with the preceding drawings and description of some aspects of the invention.

DETAILED DESCRIPTION OF THE PREFERRED EMBODIMENTS

Figure 1:
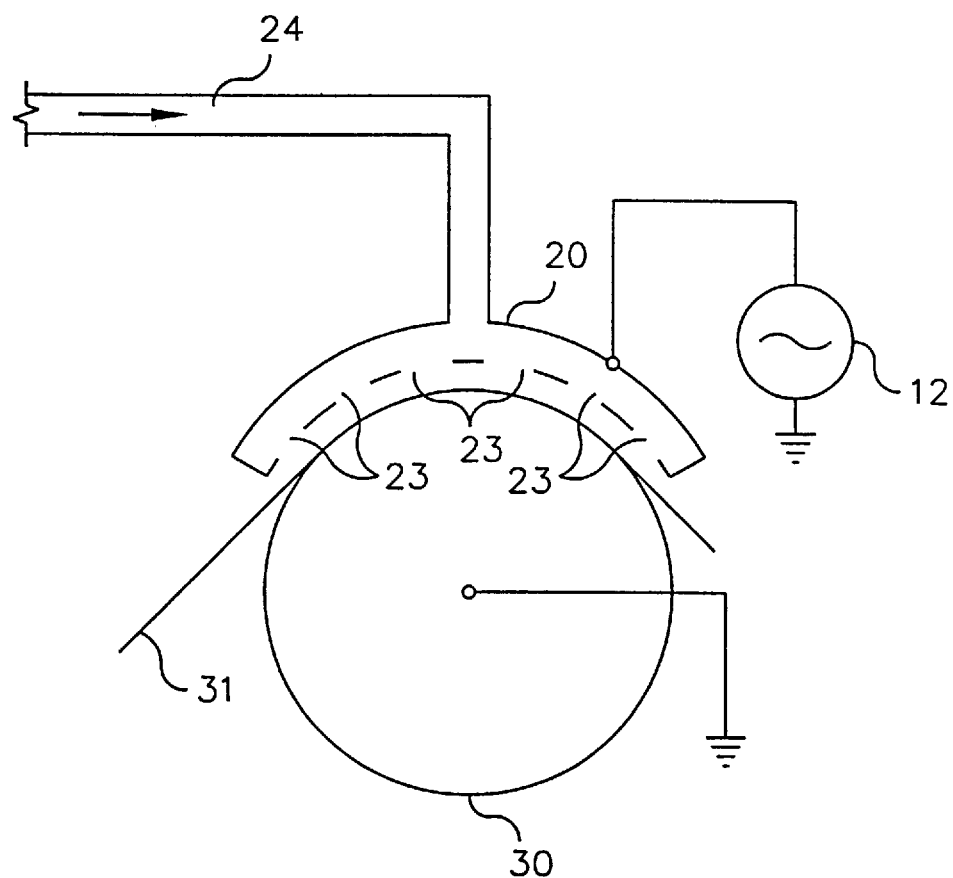
FIG. 1 is an illustration of a prior art electrode.

FIG. 1 shows a sectional view of the atmospheric glow discharge apparatus used in U.S. Pat. No. 5,714,308. Electrode 20 includes a series of apertures 23 through which the gas is supplied through inlet 24. The dimensions of electrode 20 are 12.1 cm by 13.3 cm. Electrode 20 has 333 apertures 23 each having a 1 mm diameter. The apertures are symmetrically distributed on the electrode 20. A stable glow discharge at atmospheric pressure with high percentages of reactive gas species, most notable $N_2$ and $O_2$ in He, is possible using the electrode 20 shown in FIG. 1. This allows for a more complete treatment of the paper substrate at low power. The perforated electrode configuration shown in FIG. 1 can be operated in ambient air with a mixture of 8% $N_2$ in He being supplied through the apertures 23.

Figure 3:
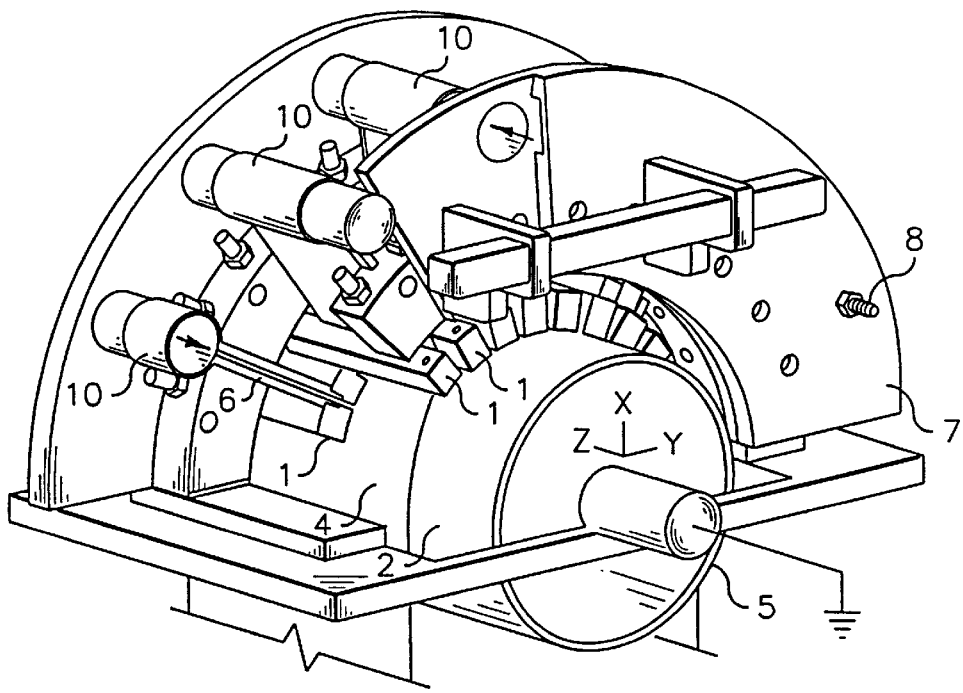
FIG. 3 is an illustration of a particularly preferred corona discharge treatment apparatus, as used in the present invention.

As it is critical to be able to use equipment which does not require the holes of the apparatus of FIG. 1, the present invention is described in FIG. 3.

Figure 2:
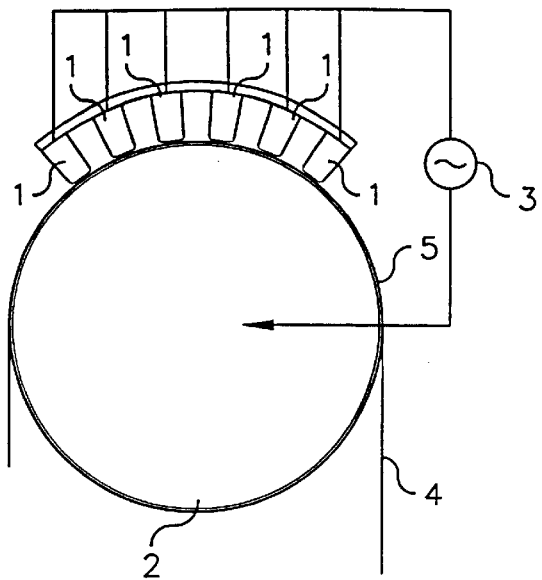
FIG. 2 is an illustration of a conventional corona discharge treatment apparatus.

FIG. 2 is a schematic representation of a conventional covered roll Corona Discharge Treatment (CDT) station. CDT is a common method for treating paper webs to render them wettable to plastic materials. The common mode for corona discharge is to operate in air. The breakdown voltage for air is such that the necessary field strengths are typically achieved by operating with small air gaps between the energized electrode and ground with high (3 to 15 KV) voltages applied. Corona charging devices achieve high field strength by virtue of small radius points or narrow gauge wires, which means that close proximity to surfaces is not important, however high currents and high power are not appropriate for such wire electrode devices. Thus corona treatment of flat webs with flat surfaced electrodes (1) and small electrode to web gaps is a natural, common, and expected application. The other aspect of corona discharge treatment is that destructive arcs will occur at high power unless runaway currents are stopped. This is typically done with dielectric barrier layers (5) capable of withstanding voltages of 15 KV or more, and thus atmospheric discharges with dielectric layers are often called barrier discharges. A necessary characteristic is that significant power can only be generated with alternating current, so typical corona discharge treaters operate with 3 KHz to 40 KHz power supplies (3). In order to be consistent in treatment, the air gaps in corona discharge treaters have to remain constant, thus typical applications to web treatment involve the use of rollers (2) to position the web (4) with electrodes (1) circumferentially located with respect to the roller. The paper web to be treated might suffice as a barrier but is usually reinforced by a dielectric in the device. If the dielectric is located on the electrode, this defines a generic class of CDT treaters commonly known as bare roll treaters. Covered roll treaters (FIG. 2), another common class of CDT treaters, use a variety of dielectrics (5) located on the roller (2) with easy to fabricate metal electrodes (1). Metal electrodes can be commonly found as multiple units of 1–2.5 cm in width, circumferentially located around the roller in order to simplify the maintenance of electrode to web surface gaps. Another common type of metal electrode is a "shoe", which is a single unit contoured to the roller diameter to maintain a constant air gap. Bare roll treaters have suffered a practical difficulty wherein dielectric covered electrodes break from the thermal shock associated with high power density concentrated on the electrode and so cooling air flows have been invented (see U.S. Pat. No. 4,446,110) to lengthen the lifetime of dielectric materials covering the electrodes and to exhaust the common CDT by-product, ozone. Typical treatment doses for corona discharge treaters operating in air are 600 to 2600 Joules per square meter. These treatment doses and the materials available for dielectrics mean that successful treatments are possible from 3 to 700 meters per minute web speeds.

The apparatus described in FIG. 3 is preferred to perform the method of the present invention; however the apparatus of FIG. 1 can also be used. It is like a standard corona discharge apparatus except that provision has been made to create substantial and uniform gas flow beneath the active electrodes and through the discharge operating at atmospheric pressure or above. The gas is introduced between pairs of electrodes and flows outward substantially displacing the surrounding air and constantly replenishing the desired gaseous composition.

FIG. 3 shows the relationship between the grounded roller (2) and the active electrodes (1) (electrodes to which the power is delivered). The power supply is connected commonly to all the electrodes (1) and to the grounded roller core (2). The roller is covered with an insulating layer (5). The web to be treated (4) is directed over the roller (2) and under the electrodes (1) which are spaced away from the web so that only small gaps remain. Typical gaps are 0.020" to 0.060" with smaller gaps preferred. The process gas enters between electrodes via delivery slits (6) which are sealed to and insulated from the electrodes with silicone rubber. The process gas is forced to flow through the discharge zone between the electrode face and the web to be treated. The process gas is delivered to the slits via tubes (10) for uniform distribution purposes. The tubes are fed from channels in the superstructure (7) and screw adjustments are available to regulate the amount of flow to individual tubes (10). Entrance to the superstructure channels is via inlets (8).

The method of the present invention is carried out at atmoshperic pressure. The method of the present invention requires that the dielectric strength of the gas in the glow discharge zone be less than that of air (approximately 35.5 kV/cm). The frequency of the excitation voltage is between 40 kHz and 13.56 Mhz, preferably between 40 kHz and 500 kHz. The electric field in the glow discharge zone must be greater than the dielectric strength of the gas.

After the paper is treated in this way, it is coated with a polymeric layer or layers preferably by extrusion from a hot melt as is known in the art. The polymer can be any coatable polymer material known in the photographic art. Representative of these materials are polyethylene, polypropylene, polystyrene, polybutylene, and copolymers thereof. Polyethylene of low, medium or high density is preferred. The polyolefin can be copolymerized with one or more copolymers to yield polyesters, such as polyethylene terephthalate (PET), or polyethylene naphthalate (PEN). In addition, other thermoplastic polymers such as polysulfones, polyurethanes, polyvinyls, polycarbonates, cellulose esters, such as cellulose acetate and cellulose propionate, and polyacrylates can be used. Specific examples of copolymerizable monomers include vinyl stearate, vinyl acetate, acrylic acid, methylacrylate, ethylacrylate, acrylamide, methacrylic acid, methylmethacrylate, ethylmethacrylate, methacrylamide, butadiene, isoprene, and vinyl chloride. Preferred polyolefins are film forming and adhesive to paper. Polyethylene having a density in the range of from about 0.91 grams/cm$^3$ to about 0.98 grams/cm$^3$ is particularly preferred. If the polyolefin is to be applied to the side of the paper whereupon the photographic emulsion will be applied, then additions to the polyolefins, may include a suitable optical brightener such as those described in Research Disclosure Issue N. 308, December 1989, Publication 308119, Paragraph V, Page 998, in an amount of from about 0.001 to about 0.25 percent by weight based on the total weight of the polyolefin coating, including any white pigment present, with 0.01 to about 0.1 percent being the most preferred. Any suitable white pigment may be incorporated in the polyolefin layer, such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The pigment is used in any form that is conveniently dispersed within the polyolefin. The preferred pigment is titanium dioxide and the preferred titanium dioxide is the anatase crystalline form. Preferably, the white pigment should be employed in the range of from about 3 to about 35 percent by weight, based on the total weight of the polyolefin coating. Anatase titanium dioxide at from about 5 to about 20 percent is most preferred.

In addition to the brightener mixture and the white pigment, the polyolefin coating can contain, if desired, a variety of additives including antioxidants such as 4,4'-butylidene-bis(6-tert-butyl-meta-cresol), di-lauryl-3,3'-thiodipropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3', 5'-di-tert-butyl-4'-hydroxyphenyl propionate), combinations of the above, and the like; heat stabilizers, such as higher aliphatic acid metal salts such as magnesium stearate, calcium stearate, zinc stearate, aluminum stearate, calcium stearate, zinc stearate, aluminum stearate, calcium palmitate, sodium palmitate, zirconium octylate, sodium laurate, and salts of benzoic acid such as sodium benzoate, calcium benzoate, magnesium benzoate and zinc benzoate; antistatic agents; lubricants; dyes; and the like, as is well known to those skilled in the art. Additionally, emulsion side resins can contain one or more pigments, such as the blue, violet or magenta pigments described in U.S. Pat. No. 3,501,298, or pigments such as barium sulfate, colloidal silica, calcium carbonate and the like.

The paper base material employed in accordance with the invention can be any paper base material which has heretofore been considered useful for a photographic support. The weight and thickness of the support can be varied depending on the intended use. A preferred weight range is from about 20 g/m$^2$ to about 500 g/m$^2$. Preferred thickness (those corresponding to commercial grade photographic paper) are from about 20 $\mu$m to about 500 $\mu$m. It is preferred to use a paper base material calendered to a smooth surface. The paper base material can be made from any suitable paper stock preferably comprising hard or softwood. Either bleached or unbleached pulp can be utilized as desired. The paper base material can also be prepared from partially esterified cellulose fibers or from a blend of wood cellulose and a suitable synthetic fiber such as a blend of wood cellulose and polyethylene fiber.

As is known to those skilled in the art, the paper base material can contain, if desired, agents to increase the strength of the paper such as wet strength resins, e.g., the amino-aldehyde or polyamide-epichlorohydrin resins, and dry strength agents, e.g., starches, including both ordinary starch and cationic starch, or polyacrylamide resins. In a preferred embodiment of this invention, the amino-aldehyde or polyamide-epichlorohydrin and polyacrylamide resins are used in combination as described in U.S. Pat. No. 3,592,731. Other conventional additives include water soluble gums, e.g., cellulose ethers such as carboxymethyl cellulose, sizing agents, e.g., aldyl ketene dimers, sodium stearate which is precipitated on the pulp fibers with a polyvalent metal salt such as alum, aluminum chloride or aluminum salts.

The polyolefin can be extruded with a wide temperature range, i.e., 150° C.–340° C., and speeds, e.g., about 3 m/min. to 700 m/min., depending on the particular intended application of the support. For many applications, preferred extrusion temperatures are about 310° –330° C. Optical brighteners stable at such temperatures, fillers, such as TiO$_2$, slip agents, antioxidants and the like, may be incorporated into the polyolefin. Under these conditions, the aforedescribed polyolefin coating, over which the silver halide emulsion is applied, is coated onto the paper base material in a coverage of from about 5 to about 200 g/m$^2$, at a uniform thickness ranging from about 5 to about 200 $\mu$m. About the same coverage of clear polyethylene coating preferably is applied to the side of the paper base material opposite to the pigmented polyolefin coating.

In addition to melt extruded polymeric coatings, other layers can be adhered to the paper, such as an antistatic layer, or aqueous and non aqueous inks.

The invention will be further illustrated by the following examples. In the bond tests used in the examples, the technique used to measure bond strength is TAPPI Std T 539 cm-88.

COMPARATIVE EXAMPLE 1

Photographic grade paper support having a thickness of 165 micrometers is passed through a conventional CDT device at a speed of 30 m/min and a power density of 0.36 Joules/cm$^2$. The paper is wound up in a roll, and then several minutes later coated with polyethylene of density 0.945 g/cc, which was melted in a single screw extruder and forced through a T die at a melt temperature of 316° C. The thickness of the polymer laminated onto the paper is 25 micrometers. The lamination process was run at several speeds, and the results are shown in table 1.

TABLE 1

| Corona Treatment Bond Results | |
|---|---|
| Speed | Bond |
| 120 m/min | excellent |
| 150 m/min | excellent |
| 180 m/min | excellent |
| 210 m/min | spotty |
| 240 m/min | spotty |

As table 1 shows, the use of conventional CDT allows excellent bond up to speeds of 180 m/min. If the speed is appreciably faster, the quality of the bond becomes less desirable.

EXAMPLE 2

The treatment device as shown in FIG. 3 was operated using a gas mixture of 2.4% O$_2$, with the balance being Helium. A power supply operating at a frequency of 450 kHz was used. Six bare titanium treatment bars, spaced 0.76 mm from the rubber coated drum, were utilized. A 125 micrometer thick photographic grade paper was transported through the treatment device such that the treatment level was 0.64

Joules/cm². After treatment the paper support was wound into a roll, and in a few minutes coated with 316° C. polyethylene of density 0.945 g/cm³ at various speeds. The adhesion results are shown in table 2.

TABLE 2

Atmospheric Glow Treatment Results

| Speed | Bond |
| --- | --- |
| 180 m/min | excellent |
| 210 m/min | excellent |

Table 2 shows that excellent bond at speeds of at least 210 m/min can be attained using this treatment method, an improvement over comparative example 1.

EXAMPLE 3

Example 3 is the same as example 2, except the treatment level is reduced to 0.32 Joules/cm2. The adhesion is shown in table 3.

AGDT at power density of .32 Joules/cm2

| Speed | Bond |
| --- | --- |
| 120 m/min | excellent |
| 150 m/min | excellent |
| 180 m/min | excellent |
| 210 m/min | excellent |
| 240 m/min | excellent |

EXAMPLE 4

Example 4 is the same as example 3 except the gas mixture consists of 5.9% N2, with the balance being Helium. Table 4 shows the adhesion results.

TABLE 4

AGDT using N2/He

| Speed | Bond |
| --- | --- |
| 180 m/min | excellent |

The bond is at least as good as CDT.

Roth et al (WO 94/28568) present an analysis of an atmospheric glow discharge device in which they calculate a lower limit for the frequency at which a discharge can be sustained. According to them, this frequency is given by $$v = \frac{eV}{\pi m \gamma d^2} \text{ Hz}$$

where e is the ionic charge, V is the root-mean-square discharge voltage, m is the ionic mass, γ is the ionic collision frequency (given by Roth et al as 6.8×10⁹ per second) and d is the plate separation for the discharge. At 450 kHz, the helium discharges of the present invention operate at an electrode separation of 0.76 mm with an rms. voltage of 1100 V. According to Roth's teachings, the minimum frequency at which a discharge can be sustained under these conditions is 2.2 MHz. The effective treatment above operate at 450 kHz, which is 5 times lower than the lower limit that Roth teaches. Suprisingly, as shown by examples 2, 3 and 4, the present invention shows that an atmospheric glow discharge is possible although not predicted by Roth.

Silver halide emulsions were coated on the papers of Examples 2–4. The emulsions were chemically and spectrally sensitized as described below.

Blue Sensitive Emulsion (Blue EM-1, prepared similarly to that described in U.S. Pat. No. 5,252,451, column 8, lines 55–68): A high chloride silver halide emulsion was precipitated by adding approximately equimolar silver nitrate and sodium chloride solutions into a well-stirred reactor containing gelatin peptizer and thioether ripener. $Cs_2Os(NO)Cl_5$ dopant was added during the silver halide grain formation for most of the precipitation, followed by a shelling without dopant. The resultant emulsion contained cubic shaped grains of 0.76 μm in edgelength size. This emulsion was optimally sensitized by the addition of a colloidal suspension of aurous sulfide and heat ramped up to 60° C. during which time blue sensitizing dye BSD-1, 1-(3-acetamidophenyl)-5-mercaptotetrazole and potassium bromide were added. In addition, iridium dopant was added during the sensitization process.

Green Sensitive Emulsion (Green EM-1): A high chloride silver halide emulsion was precipitated by adding approximately equimolar silver nitrate and sodium chloride solutions into a well-stirred reactor containing gelatin peptizer and thioether ripener. $Cs_2Os(NO)Cl_5$ dopant was added during the silver halide grain formation for most of the precipitation, followed by a shelling without dopant. Iridium dopant was added during the late stage of grain formation. The resultant emulsion contained cubic shaped grains of 0.30 μm in edgelength size. This emulsion was optimally sensitized by addition of green sensitizing dye GSD-1, a colloidal suspension of aurous sulfide, heat digestion followed by the addition of 1-(3-acetamidophenyl)-5-mercaptotetrazole and potassium bromide.

Red Sensitive Emulsion (Red EM-1): A high chloride silver halide emulsion was precipitated by adding approximately equimolar silver nitrate and sodium chloride solutions into a well-stirred reactor containing gelatin peptizer and thioether ripener. The resultant emulsion contained cubic shaped grains of 0.40 μm in edgelength size. This emulsion was optimally sensitized by the addition of a colloidal suspension of aurous sulfide followed by a heat ramp, and further additions of 1-(3-acetamidophenyl)-5-mercaptotetrazole, potassium bromide and red sensitizing dye RSD-1. In addition, iridium dopant was added during the sensitization process.

Coupler dispersions were emulsified by methods well known to the art, and the following layers were coated on a polyethlene resin coated paper support, that was sized as described in U.S. Pat. No. 4,994,147 and pH adjusted as described in U.S. Pat. No. 4,917,994. The polyethylene layer coated on the emulsion side of the support contained a mixture of 0.1% (4,4'-bis(5-methyl-2-benzoxazolyl) stilbene and 4,4'-bis(2-benzoxazolyl) stilbene, 12.5% $TiO_2$, and 3% ZnO white pigment. The layers were hardened with bis (vinylsulfonyl methyl) ether at 1.95% of the total gelatin weight.

Layer 1: Blue Sensitive Layer
  Gelatin 1.530 g/m²
  Blue Sensitive Silver (Blue EM-1) 0.280 g Ag/m²
  Y-1 1.080 g/m²
  Dibutyl phthalate 0.260 g/m²
  2-(2-butoxyethoxy)ethyl acetate 0.260 g/m²
  2,5-Dihydroxy-5-methyl-3-(1-piperidinyl)-2-cyclopenten-1-one 0.002 g/m²
  ST-16 0.009 g/m²
Layer 2: Interlayer
  Gelatin 0.753 g/m²
  Dioctyl hydroquinone 0.094 g/m²

Dibutyl phthalate 0.282 g/m²
Disodium 4,5 Dihydroxy-m-benzenedisulfonate 0.065 g/m²
SF-1 0.002 g/m²
Layer 3: Green Sensitive Layer
  Gelatin 1.270 g/m²
  Green Sensitive Silver (Green EM-1) 0.263 g Ag/m²
  M-1 0.389 g/m²
  Dibutyl phthalate 0.195 g/m²
  2-(2-butoxyethoxy)ethyl acetate 0.058 g/m²
  ST-2 0.166 g/m²
  Dioctyl hydroquinone 0.039 g/m²
  Phenylmercaptotetrazole 0.001 g/m²
Layer 4: UV Interlayer
  Gelatin 0.484 g/m²
  UV-1 0.028 g/m²
  UV-2 0.159 g/m²
  Dioctyl hydroquinone 0.038 g/m²
  1,4-Cyclohexylenedimethylene bis(2-ethylhexanoate) 0.062 g/m²
Layer 5: Red Sensitive Layer
  Gelatin 1.389 g/m²
  Red Sensitive Silver (Red EM-1) 0.187 g Ag/m²
  C-3 0.424 g/m²
  Dibutyl phthalate 0414 g/m²
  UV-2 0272 g/m²
  2-(2-butoxyethoxy)ethyl acetate 0.035 g/m²
  Dioctyl hydroquinone 0.004 g/m²
  Potassium tolylthiosulfonate 0.003 g/m²
  Potassium tolylsulfinate 0.0003 g/m²
Layer 6: UV Overcoat
  Gelatin 0.484 g/m²
  UV-1 0.028 g/m²
  UV-2 0.159 g/m²
  Dioctyl hydroquinone 0.038 g/m²
  1,4-Cyclohexylenedimethylene bis(2-ethylhexanoate) 0.062 g/m²
Layer 7: SOC
  Gelatin 1.076 g/m²
  Polydimethylsiloxane 0.027 g/m²
  SF-1 0.009 g/m²
  SF-2 0.004 g/m²
  Tergitol 15-S-5™ 0.003 g/m²
  DYE-1 0.018 g/m²
  DYE-2 0.009 g/m²
  DYE-3 0.007 g/m²

The coated paper of this example performed as expected.

These results demonstrate that treatments of paper support in helium or mixtures of helium with other reactive gases, done at the right frequencies, can significantly improve the adhesion between the polymer and the paper support. These types of results are not possible with conventional corona treatments, which are typically done in the frequency range from 3 to 40 kHz.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

What is claimed is:

1. A method of producing photographic support comprising:

providing a photographic paper;

transporting said photographic paper through an atmospheric glow discharge zone, wherein said atmospheric glow discharge zone contains a gas with a dielectric strength which is less than air;

subjecting said atmospheric glow discharge zone to an electric frequency between 40 kHz and 13.56 Mhz and an electric field such that an atmospheric glow discharge is formed; and coating said photographic paper with a polymeric coating.

2. The method of claim 1, wherein the gas comprises helium.

3. The method of claim 2, wherein the gas further comprises gases selected from the group consisting of oxygen and nitrogen.

4. The method of claim 1, wherein said atmospheric glow discharge zone comprises a gap of between 0.02 to 0.06 inches.

5. The method of claim 1, wherein said dielectric strength of the gas within the atmospheric glow discharge zone is less than 35.5 kV/cm.

6. The method of claim 1, wherein said electric frequency is between 40 kHz and 500 kHz.

7. The method of claim 1, wherein the polymeric coating is selected from the group consisting of polyethylene, polypropylene, polystyrene, polybutylene, polyethylene terephthalate, polysulfones, polyurethanes, polyvinyls, polycarbonates, cellulose esters and polyacrylates.

8. The method of claim 5, wherein the polymeric coating further comprises copolymerizable monomers selected from the group consisting of vinyl stearate, vinyl acetate, acrylic acid, methylacrylate, ethylacrylate, acrylamide, methacrylic acid, methylmethacrylate, ethylmethacrylate, methacrylamide, butadiene, isoprene, and vinyl chloride.

9. The method of claim 1, wherein the polymeric coating further comprises optical brighteners, pigments, antioxidants, and heat stabilizers.

10. The method of claim 1, wherein the photographic paper has a weight range of from about 20 g/m² to about 500 g/m².

11. The method of claim 1, wherein the photographic paper has a thickness of from about 20 μm to about 500 μm 12. The method of claim 1, wherein the photographic paper is transported through said atmospheric glow discharge zone at a speed of from 3 m/min to 700 m/min.

13. The method of claim 1, further comprising:

coating the polymeric layer with a silver halide emulsion layer.

* * * * *